March 30, 1965 W. R. WINTER 3,175,341
COLLECTOR CELLS FOR ELECTROSTATIC PRECIPITATORS
Filed May 1, 1962 4 Sheets-Sheet 4
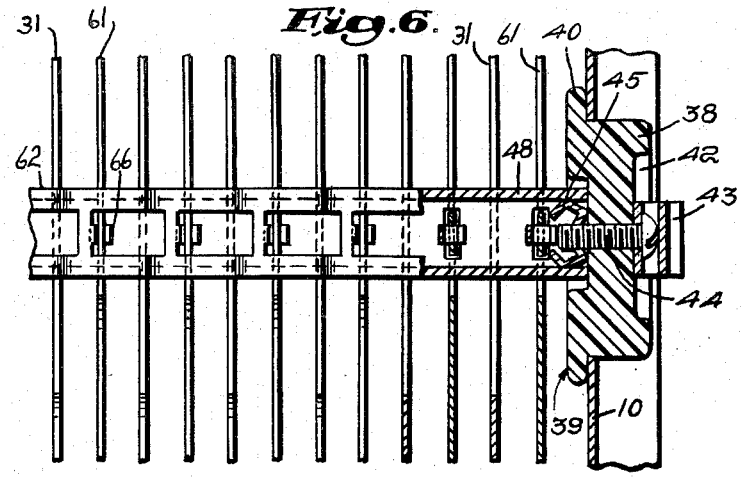
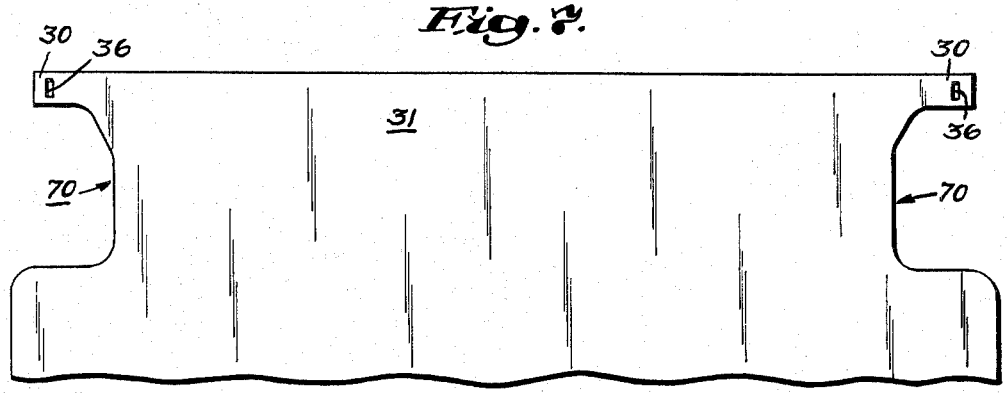
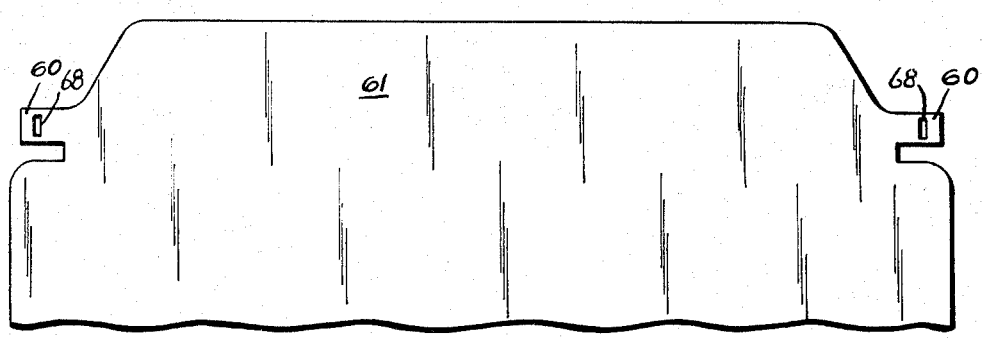
Inventor:
William R. Winter,
by Robert J. Palmer
Attorney United States Patent Office 3,175,341
Patented Mar. 30, 1965

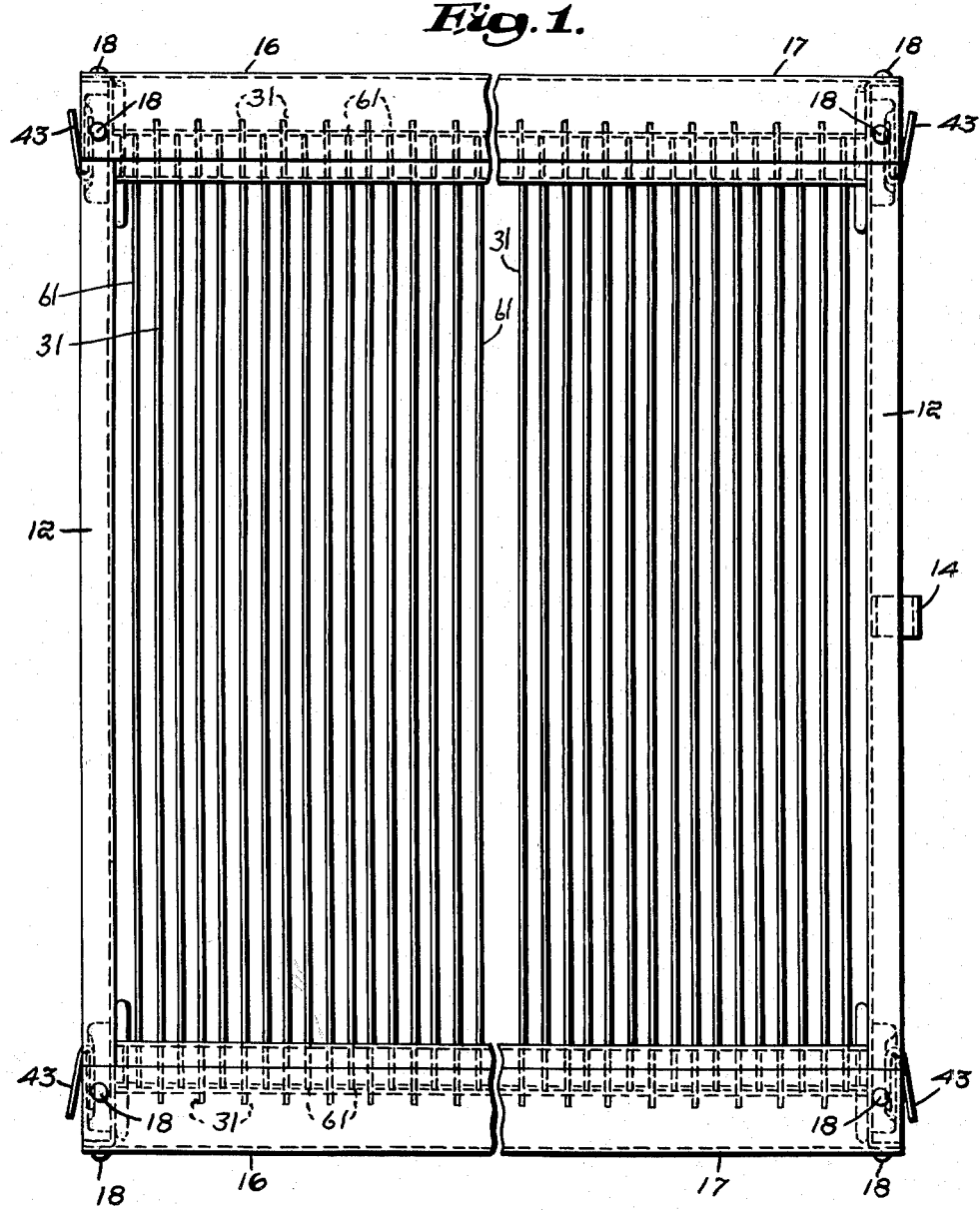

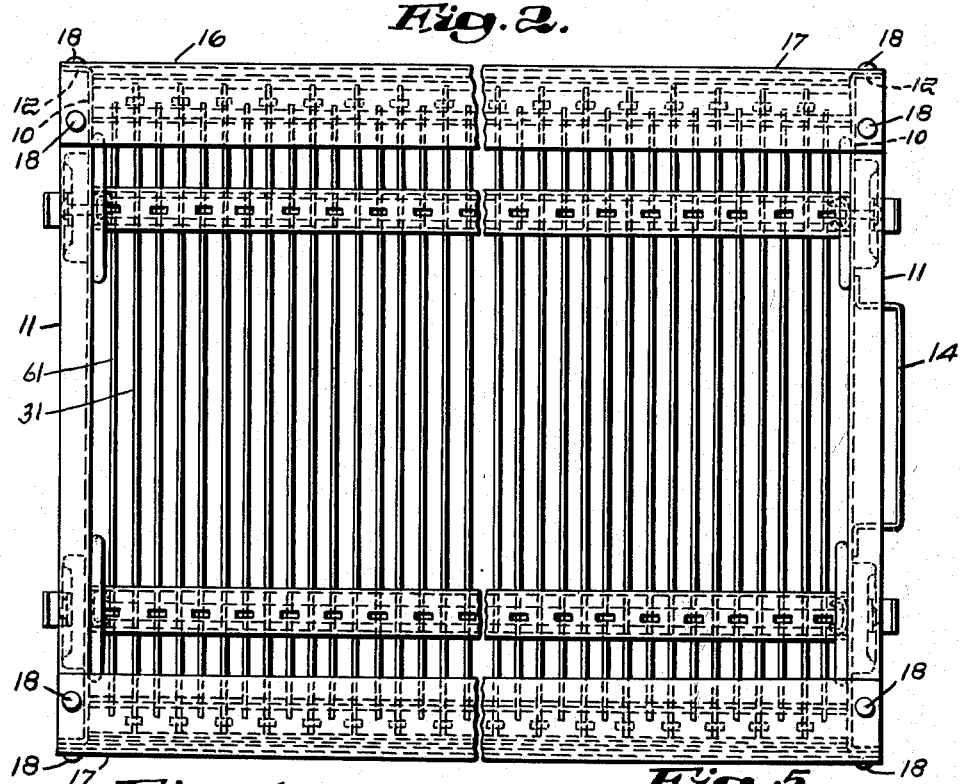
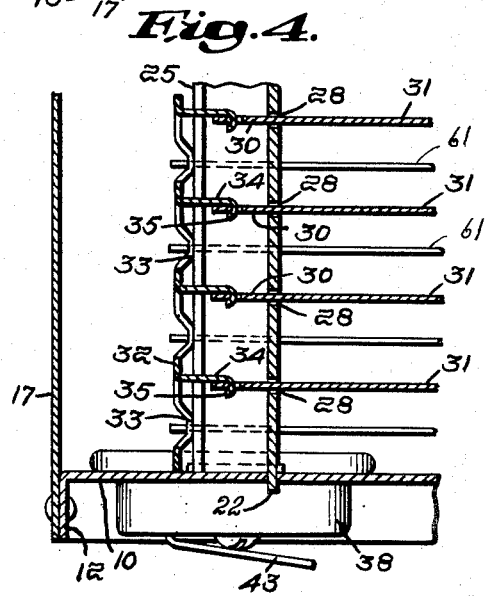
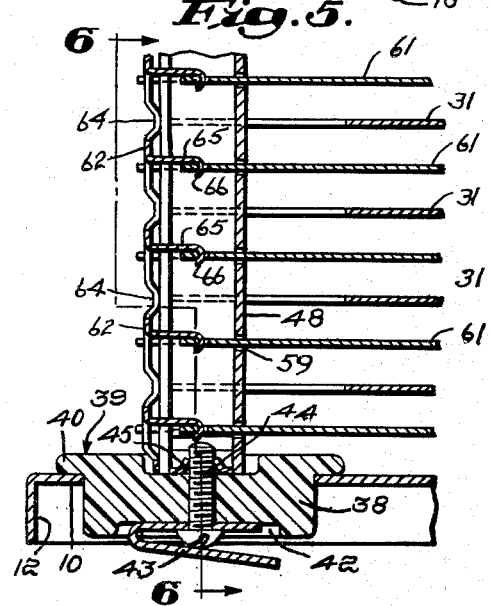

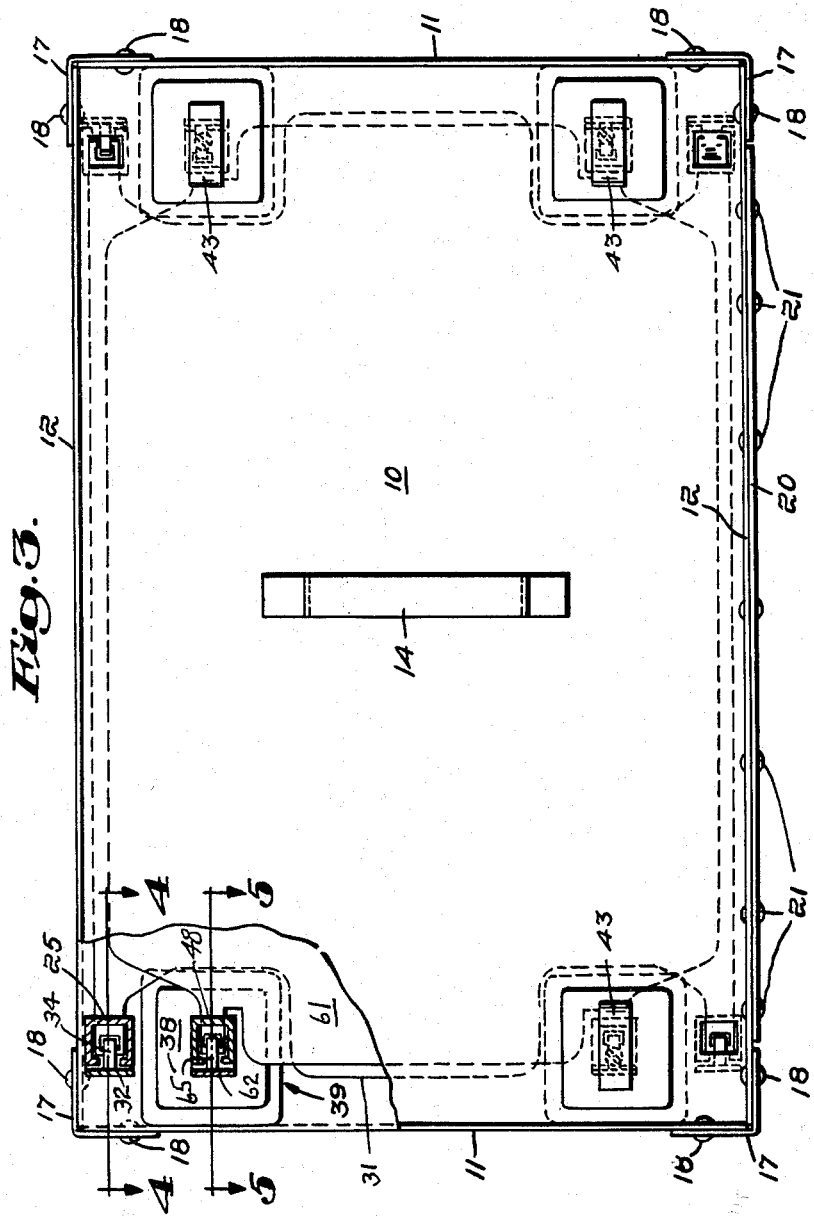

3,175,341
COLLECTOR CELLS FOR ELECTROSTATIC
PRECIPITATORS
William R. Winter, Staunton, Va., assignor to Westinghouse Electric Corporation, Pittsburgh, Pa., a corporation of Pennsylvania
Filed May 1, 1962, Ser. No. 191,633
6 Claims. (Cl. 55—143)

This invention relates to collector cells of electrostatic precipitators.

The collector cells of high efficiency, electrostatic precipitators used for cleaning air, usually consist of a number of parallel collector plates, alternate ones of which are insulator supported, and the others of which are grounded. The insulator supported plates are usually connected to the positive terminal of a high voltage, D.C. source, the negative terminal of which is connected to the grounded plates. A widely used collector cell of this type is that disclosed in the U. S. Patent to E. L. Richardson, 2,535,696 which uses tie rods and spacers for spacing and supporting the collector plates. For maximum collection efficiency, the plates should be closely spaced since the electrostatic collection field increases as spacing decreases. Heretofore, manufacturing tolerances have been such that the plates have not been uniformly spaced with the result that voltages high enough to provide high efficiency collection between the most widely spaced plates results in arc-overs between more closely spaced plates. Also, supporting and spacing the plates with tie rods and spacers, and other prior methods of supporting and spacing the plates, have resulted in excessive labor and material costs.

An object of this invention is to reduce the manufacturing costs of collector cells.

Another object of this invention is to maintain uniform spacing between the collector plates of a collector cell.

Another object of this invention is to maintain individual tension on each collector plate of a collector cell to keep the plates flat, parallel, and uniformly spaced.

The invention will now be described with reference to the annexed drawings, of which:

FIG. 1 is a plan view of a collector cell embodying this invention;

FIG. 2 is a side view of the cell;

FIG. 3 is an end view of the cell;

FIG. 4 is an enlarged section along lines 4—4 of FIG. 3;

FIG. 5 is an enlarged section along the lines 5—5 of FIG. 3;

FIG. 6 is a view along the lines 6—6 of FIG. 5;

FIG. 7 is an enlarged side view of one of the grounded plates of the cell, and

FIG. 8 is an enlarged side view of the upper portion of one of the insulator supported plates of the cell.

The cell has similar, rectangular, pan-shaped, metal end sheets 10 with flanged vertical sides 11, and flanged horizontal sides 12 extending outwardly therefrom perpendicular thereto. One of the sheets 10, the right one of FIG. 2 has a handle 14 for facilitating the installation and removal of the cell. Angles 17 extend around the corners of the sheets 10 and are secured to the sides 12 thereof by rivets 18. Straps 20 extend along the lower surfaces of the lower sides 12 of the sheets 10, and are attached thereto by rivets 21.

The ends of four, generally U-shaped, metal channels 25 for supporting the grounded plates of the cell, extend between the end sheets 10, and have their bases extended at their ends beyond their U-shaped portions, as short, rectangular straps 22 which extend into conformably shaped slots in the sheets 10 for supporting the channels 25 from the sheets 10. The bases of the channels 25 have a plurality of spaced-apart slots 28, through which extend tabs 30 at the corners of grounded, metal, collector plates 31. Generally sine-wave-shaped, with flattened peaks, clips 32 of spring metal, have spaced-apart, flattened, inner edges 33 in contact with the outer edges of the spaced-apart legs of the channels 25, and have punched from their central portions between their edges 33, inwardly extending fingers 34 with hooks 35 on their inner ends which extend into slots 36 in the tabs 30 on the grounded collector plates 31. To insert the hooks 35 in the slots 36 requires pulling the hooks inwardly, placing the clips 32 in spring tension, with the plates 31 stretched by the spring tension in the clips 32. The plates 31 are supported in parallel relationship, uniformly spaced apart.

Four, generally rectangular openings are provided in the end sheets 10 between and spaced from the ends of the channels 25, and in these openings are fitted conformably shaped outer portions 38 of insulators 39, these insulators having larger rectangular portions 40 with their outer surfaces in contact with the inner surfaces of the sheets 10 around the openings through which the insulator portions 38 extend. The outer surfaces of the insulator portions have central recesses 42 formed therein, and in these recesses are inner portions of folded, spring terminal clips 43 through which extend metal screws 44 threaded into speed nuts 45 of metal fitted into the ends of generally U-shaped metal channels 48. These bases of the channels 48 have a plurality of spaced-apart slots 59, through which extends tabs 60 on insulator supported, metal collector plates 61 near their corners. Generally sine-wave-shaped, with flattened peaks, clips 62 of spring metal, similar to the previously described clips 32, have spaced-apart, flattened inner edges 64 in contact with the outer edges of the spaced-apart legs of the channels 48, and have punched from their central portions between their edges 64, inwardly extending fingers 65 with hooks 66 on their inner ends which extend into slots 68 in the plates 61. To insert the hooks 66 in the slots 68 requires pulling the hooks inwardly, placing the clips 62 in spring tension, with the plates 61 stretched by the spring tension in the clips 62. The slots 59 in the bases of the channels 48 are so displaced with respect to the slots 28 in the bases of the channels 25 that the plates 61 are located midway between the plates 31.

The grounded plates 31 have inner recesses 70 near their corners for providing insulating clearance around the channels 48 which support the plates 61, and the plates 61 are cut away at their corners for providing insulating clearance around the channels 25 which support the plates 31.

The four tabs 30 on the grounded plates 31 are seen to be at the corners of similar, aligned, rectangular outlines at the plates 31. The four channels 25 are substantially at the corners of similar, aligned, rectangular outlines at the end sheets 10, which outlines are aligned with the rectangular outlines at the plates 31. The four tabs 60 on the insulator supported plates 61 are seen to be at the corners of similar, aligned, rectangular outlines at the plates 61, which outlines have opposed sides (the top and bottom sides with reference to FIG. 3) which are spaced inwardly from corresponding sides of the rectangular outlines at the plates 31. The four insulators 38 at each sheet 10 are seen to be substantially at the corners of rectangular outlines at the sheets 10 which are similar to and aligned with the rectangular outlines at the plates 61.

The channels and the spring clips not only provide a simple and inexpensive method of supporting the collector plates, but the spacing between all portions of adjacent plates is maintained more uniform than in prior methods of plate assembly by the plate stretching action provided by the spring clips.

The collector cell would be connected and operated as described in the Richardson patent referred to in the foregoing. The positive terminal of an associated power pack which is not shown could be contacted by one of the terminal clips 43, with its negative terminal connected to the frame or casing of the precipitator in which the cell is used. Adjacent cells could be connected together by being pushed together so that their terminal clips contact.

The usual upstream ionizer electrodes such as are disclosed in the G. W. Penney Patent No. 2,129,783, would be used to ionize the air entering the collector cell, so as to charge the dust particles in the air electrostatically positive. The electrostatic fields between the oppositely charged, insulator supported and grounded plates of the collector cell would cause the dust particles to deposit upon the grounded plates.

What is claimed is:

1. A collector cell for an electrostatic precipitator comprising a plurality of spaced-apart, parallel, collector plates, end sheets for said cell extending substantially parallel to said plates and spaced outwardly from the end ones of said plates, a plurality of spaced-apart, U-shaped channels extending between and supported from said sheets, said channels having bases with a plurality of spaced apart slots therein, alternate ones of said plates having tabs extending through said slots into the spaces between the legs of said channels, the outer ends of said tabs having slots therein, clips of spring metal having spaced-apart portions in contact with the outer edges of said legs midway between other portions opposite said tabs and spaced outwardly from said edges, said other portions having fingers extending into said spaces with hooks on the inner ends of said fingers extending into said slots in said tabs, insulators attached to said sheets, and means extending between said insulators for supporting said other plates from said insulators.

2. A collector cell for an electrostatic precipitator comprising a plurality of spaced-apart, parallel, collector plates, end sheets for said cell extending substantially parallel to said plates and spaced outwardly from the end ones of said plates, means extending between and attached to said sheets and to alternate ones of said plates for supporting said alternate ones of said plates from said sheets, insulators attached to said sheets, generally U-shaped channels extending between and supported from said insulators, said channels having bases with a plurality of spaced-apart slots therein, the other ones of said plates having tabs extending through said slots into the spaces between the legs of said channels, the outer ends of said tabs having slots therein, and clips of spring metal having spaced-apart portions in contact with the outer edges of said legs midway between other portions opposite said tabs and spaced outwardly from said edges, said other portions having fingers extending into said spaces with hooks on the inner ends of said fingers extending into said slots of said tabs.

3. A collector cell for an electrostatic precipitator comprising a plurality of spaced-apart, parallel collector plates, end sheets for said cell extending substantially parallel to said plates and spaced outwardly from the end ones of said plates, a plurality of generally U-shaped channels extending between and supported from said sheets, said channels having bases with a plurality of spaced-apart slots therein, alternate ones of said plates having tabs extending through said slots into the spaces between the legs of said channels, the outer ends of said tabs having slots therein, clips of spring metal having spaced-apart portions in contact with the outer edges of said legs midway between other portions opposite said tabs and spaced outwardly from said edges, said other portions having fingers extending into said slots of said tabs, a plurality of spaced-apart insulators attached to said sheets, generally U-shaped channels extending between and supported from said insulators, said last mentioned channels having bases with a plurality of spaced-apart slots therein, the other ones of said plates having tabs extending through said last mentioned slots into the spaces between the legs of said last mentioned channels, the outer ends of said last mentioned tabs having slots therein, and clips of spring metal having spaced-apart portions in contact with the outer edges of said last mentioned legs between other portions spaced outwardly from said last mentioned edges, said last mentioned other portions having fingers extending into said last mentioned spaces with hooks on the inner ends of said last mentioned fingers extending into said last mentioned slots.

4. A collector cell for an electrostatic precipitator comprising a plurality of space-apart, parallel, generally rectangular, collector plates, alternate ones of said plates having slots in their corner portions, end sheets for said cell extending substantially parallel to said plates and spaced outwardly from the end ones of said plates, plate supporting means extending between said sheets at said corner portions and attached at their ends to said sheets, spring means supported by said supporting means, means extending from said spring means into said slots for supporting said alternate plates from said spring means, the other ones of said plates having cut-outs for clearing said plate supporting means and said spring means, said other plates having slots in their corner portions, plate supporting means extending between said sheets at said last mentioned corner portions, means including insulators attached to said sheets for supporting said last mentioned plate supporting means from said sheets, spring means supported by said last mentioned plate supporting means, and means extending from said last mentioned spring means into said last mentioned slots for supporting said other plates from said last mentioned spring means, said alternate plates having cut-outs for clearing said last mentioned plate supporting means extending between said sheets and said last mentioned spring means.

5. A collector cell for an electrostatic precipitator comprising a plurality of spaced-apart, parallel, generally rectangular, collector plates, alternate ones of said plates having slots in their corner portions, end sheets for said cell extending substantially parallel to said plates and spaced outwardly from the end ones of said plates, spring means extending between said sheets at said corner portions, means extending between said sheets and attached at their ends to said sheets for supporting said spring means from said sheets, means extending from said spring means into said slots for supporting said alternate plates from said spring means, the other ones of said plates having cut-outs for clearing said spring means and said first mentioned supporting means, said other plates having slots in their corner portions, spring means extending between said sheets at said last mentioned corner portions, insulators attached to said sheets, means extending between said insulators and connected at their ends to said insulators for supporting said last mentioned spring means from said sheets, and means extending from said last mentioned spring means into said slots in said last mentioned corner portions for supporting said other plates from said last mentioned spring means, said alternate plates having cut-outs for clearing said last mentioned spring means and said means extending between said insulators.

6. A collector cell for an electrostatic precipitator comprising a plurality of spaced-apart, parallel, generally rectangular, collector plates, tabs on the corner portions of alternate ones of said plates, said tabs having slots therein, end sheets for said cell extending substantially parallel to said plates and spaced outwardly from the end ones of said plates, spring means extending between said sheets at said corner portions, supporting means extending between said sheets and attached at their ends to said sheets for supporting said spring means from said sheet, said supporting means being between said corner portions and said spring means and having slots therein through which said tabs extend, means extending from said spring means into said slots in said tabs for supporting said alternate plates from said spring means, the other ones of said plates having cutouts for clearing said spring means and said first mentioned supporting means, tabs on the corner portions of said other plates, said last mentioned tabs having slots therein, spring means extending between said sheets at said last mentioned corner portions, insulators attached to said sheets, supporting means extending between and attached at their ends to said insulators for supporting said last mentioned spring means from said insulators, said last mentioned supporting means being between said last mentioned corner portions and said last mentioned spring means and having slots through which said last mentioned tabs extend, and means extending from said last mentioned spring means into said slots in said last mentioned tabs for supporting said other plates from said last mentioned spring means, said alternate plates having cut-outs for clearing said last mentioned spring means and said supporting means extending between said insulators.

References Cited by the Examiner

UNITED STATES PATENTS

| | | | |
|---|---|---|---|
| 1,843,510 | 2/32 | Hale | 55—147 X |
| 2,535,696 | 12/50 | Richardson | 55—143 |
| 2,852,092 | 9/58 | Fruth et al. | 55—145 |
| 2,932,359 | 4/60 | Fields | 55—143 X |
| 3,018,846 | 1/62 | Czerwonka et al. | 55—143 |

FOREIGN PATENTS

| | | |
|---|---|---|
| 562,043 | 6/44 | Great Britain. |
| 764,237 | 12/56 | Great Britain. |

HARRY B. THORNTON, *Primary Examiner.*

ROBERT F. BURNETT, *Examiner.*